(12) United States Patent
Mashima et al.

(10) Patent No.: US 9,530,010 B2
(45) Date of Patent: Dec. 27, 2016

(54) ENERGY USAGE DATA MANAGEMENT

(71) Applicant: FUJITSU LIMITED, Kawasaki-shi, Kanagawa (JP)

(72) Inventors: Daisuke Mashima, Sunnyvale, CA (US); Gaurav Lahoti, Champaign, IL (US)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 14/498,942

(22) Filed: Sep. 26, 2014

(65) Prior Publication Data
US 2015/0128283 A1 May 7, 2015

Related U.S. Application Data

(60) Provisional application No. 61/901,308, filed on Nov. 7, 2013.

(51) Int. Cl.
G06F 7/04 (2006.01)
G06F 17/30 (2006.01)
H04N 7/16 (2011.01)
G06F 21/60 (2013.01)
G06Q 50/06 (2012.01)
G06Q 10/10 (2012.01)
H04L 9/32 (2006.01)

(52) U.S. Cl.
CPC ............ G06F 21/60 (2013.01); G06Q 10/10 (2013.01); G06Q 50/06 (2013.01); H04L 9/3242 (2013.01); H04L 9/32 (2013.01); H04L 9/3236 (2013.01)

(58) Field of Classification Search
CPC ........ G06F 21/60; G06Q 50/06; H04L 9/132; H04L 9/3236; H04L 9/3242
See application file for complete search history.

(56) References Cited

U.S. PATENT DOCUMENTS 4,554,466 A * 11/1985 Dillon .................... H03K 3/037
327/199
4,574,346 A * 3/1986 Hartung .............. G06F 12/0866
711/112
5,278,838 A * 1/1994 Ng ...................... G11B 20/1833
714/6.12

(Continued)

OTHER PUBLICATIONS

"Redactable and Auditable Data Access for Bioinformatics Research", Brown et al., AMIA Jt Summits Transl Sci Proc. Mar. 18, 2013.*

(Continued)

Primary Examiner — Jayesh Jhaveri
(74) Attorney, Agent, or Firm — Maschoff Brennan

(57) ABSTRACT

A method including receiving energy usage data representative of energy usage of a customer during a particular time period. The energy usage data is sign with a digital signature of a utility. The method includes receiving input of a customer effective to select a data block of the energy usage data. The method includes redacting the selected data block from the energy usage data in response to the input. The method includes calculating a hash value for the redacted data block using a per-customer key that is unique to the customer, an initialization vector, and a counter. The method includes replacing in the energy usage data the redacted data block with the calculated hash value corresponding to the redacted data block.

20 Claims, 8 Drawing Sheets

(56) References Cited

U.S. PATENT DOCUMENTS

| | | | | |
|---|---|---|---|---|
| 5,978,475 | A * | 11/1999 | Schneier | G06F 21/6209 713/164 |
| 8,832,466 | B1 * | 9/2014 | McGregor, Jr. | H04L 9/0836 380/37 |
| 2004/0039908 | A1 * | 2/2004 | Rose | H04L 9/0637 713/168 |
| 2004/0255116 | A1 * | 12/2004 | Hane | H04L 9/3247 713/161 |
| 2005/0182932 | A1 * | 8/2005 | Wheeler | H04L 9/12 713/168 |
| 2007/0106908 | A1 * | 5/2007 | Miyazaki | G06F 21/64 713/189 |
| 2008/0104407 | A1 * | 5/2008 | Horne | G06F 21/64 713/178 |
| 2008/0130895 | A1 * | 6/2008 | Jueneman | H04L 9/3066 380/277 |
| 2009/0070361 | A1 * | 3/2009 | Haber | G06F 21/6254 |
| 2009/0249220 | A1 * | 10/2009 | Golle | G06F 21/64 715/751 |
| 2012/0297198 | A1 * | 11/2012 | Danezis | H04L 9/3247 713/179 |
| 2013/0305178 | A1 | 11/2013 | Matsuzawa et al. | |
| 2015/0025934 | A1 * | 1/2015 | Mashima | G06Q 30/0201 705/7.29 |
| 2015/0058301 | A1 * | 2/2015 | Kolodner | G06F 17/30156 707/692 |
| 2015/0082399 | A1 * | 3/2015 | Wu | G06F 21/6209 726/6 |

OTHER PUBLICATIONS

D. Ateniese et al., "Sanitizable Signatures" ESORICS 2005, LNCS 3679, pp. 159-177, Sep. 2005.

T. Izu et al., "PIATS: A Partially Sanitizable Signature Scheme" ESORICS 2005, LNCS 3679, pp. 72-83, Sep. 2005.

Johnson R. et al., "Homomorphic Signature Schemes." Topics in Cryptology: The Cryptographers' Track at the RSA Conference (Feb. 18, 2002) vol. 2271, pp. 244-262.

Efthymiou C. et al., "Smart Grid Privacy via Anonymization of Smart Metering Data," Smart Grid Communications (Oct. 4, 2010), First IEEE International Conference, IEEE. pp. 238-243.

European Search Report dated Feb. 26, 2015 in application No. EP 14 19 0251.

* cited by examiner

```
<entry>
        <id>urn:uuid:55673B87-3009-4B05-B5BD-C9E841C7B154
        </id>
        <content type="">
                <ns2:SignatureInformation>
                        <ns2:SignatureValue>2a444b90bdd8fdeb07352
                        49cf7169826588c8a85e5ea5d090e7e332b91f580
                        a71620f50d4a05ee88facec0857cfd125c01209fa
                        c642006ebb8f76b82c4e5bc42 </ns2:SignatureValue>
                        <ns2:SignatureAlgorithm>SHA1withRSA
                        </ns2:SignatureAlgorithm>
                </ns2:SignatureInformation>
        </content>
</entry>
```

*Fig. 4A*

```
<entry>
        <id>urn:uuid:CF2BB894-FAAF-4408-95C2-559091C0D0D0
        </id>
        <content type="">
                <ns2:HashInformation>
                <ns2:HashAlgorithm>HmacSHA1 </ns2:HashAlgorithm>
                <ns2:InitializationVectorValue>8ea31f5b3d
                d56ec30ebd014c2da10029aeb34830974d69d5dae
                d34ce85a179fdf936c043d5c581823542671913d4
                b4714fe2a96a756b9a035998b3d3127987eb </ns2:InitializationVectorValue>
                </ns2:HashInformation>
        </content>
</entry>
```

*Fig. 4B*

```
                                                            ┌─ 314
<entry>
      <id>urn:uuid:5746036f-3d85-4cdb-a2be-c70a0e53a30f
      </id>
      <linkrel="self"href="RetailCustomer/41/UsagePoint/01/ElectricPowerUsageSumary/01"/>
      <linkrel="up"href="RetailCustomer/41/UsagePoint/01/ElectricPowerUsageSummary"/>
      <title>Usage Summary</title>
      <content>
            <ns2:ElectricPowerUsageSummaryHash>
                  <ns2:value>7338865b07eccd5524bb5cd9230ae9
                  bf50f65f94</ns2:value>
            </ns2:ElectricPowerUsageSummaryHash>
      </content>
      <published>2013-04-04T03:35:38Z</published>
      <updated>2013-04-04T03:35:38Z</updated>
</entry>
```

*Fig. 4C*

```
                                                            ┌─ 308
<ns2:IntervalHash>
      <ns2:timePeriod>
            <ns2:duration>9830400</ns2:duration>
            <ns2:start>1335192900</ns2:start>
      </ns2:timePeriod>
      <ns2:value>b00ab83b5c2cbc222f472ede0bd73520d1bdbb 0c</ns2:value>
      <ns2:hiddenBlocks>32768</ns2:hiddenBlocks>
</ns2:IntervalHash>
```

*Fig. 4D*

ENERGY USAGE DATA MANAGEMENT

RELATED APPLICATION

This application claims the benefit of and priority to U.S. provisional application No. 61/901,308 filed Nov. 7, 2013, which is incorporated herein by reference in its entirety.

FIELD

The embodiments discussed herein are related to energy usage data management.

BACKGROUND

Fine-grained energy usage data may leak sensitive information about a customer. Additionally, a number of service providers utilizing such data have emerged. The service provider may receive the energy usage data to perform services such as demand response services. The service providers may improve effectiveness of smart grid technologies and efficiency of the electrical grid, but do not prioritize customer privacy.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving energy usage data representative of energy usage, such as electrical energy usage, of a customer during a particular time period. The energy usage data may be signed with a digital signature of a utility. The method may include receiving input of a customer effective to select a data block of the energy usage data. The method may include redacting the selected data block from the energy usage data in response to the input. The method may include calculating a hash value for the redacted data block using a per-customer key that is unique to the customer, an initialization vector, and a counter. The method may include replacing in the energy usage data the redacted data block with the calculated hash value corresponding to the redacted data block.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4A represents an example of an enhanced data class that may be implemented in the enhanced Green Button scheme of FIG. 3;

FIG. 4B represents another example of an enhanced data class that may be implemented in the enhanced Green Button scheme of FIG. 3;

FIG. 4C represents another example of an enhanced data class that may be implemented in the enhanced Green Button scheme of FIG. 3;

FIG. 4D represents another example of an enhanced data class that may be implemented in the enhanced Green Button scheme of FIG. 3.

DESCRIPTION OF EMBODIMENTS

Broad penetration of smart meters and advanced metering infrastructure (AMI) has enabled bidirectional communication between utilities and customers and collection of fine-grained energy consumption data. The broad penetration of the smart meters may provide some benefits to both the generation and distribution side and the demand side of energy systems.

For instance, a utility may use collected data to better predict peak demand, which may help to avoid service outages and improve the stability of the grid. Also, customers may benefit by knowing and optimizing their energy consumption patterns to improve energy efficiency.

The landscape around data management and sharing in smart grid systems is getting more complicated. For instance, data analytics on energy usage data of customers is often outsourced by utilities to third parties. An example is the partnership between PG&E, a utility company, and Opower, a software-as-a-service company, which provides PG&E recommendation services. Another example of third party services includes demand-response (DR) aggregators that facilitate large-scale DR services.

Such third party services may play an important role in the smart grid, but privacy of the customers may not be the first priority. For instance some DR aggregators install their own metering device at sites to obtain meter reading data and facilitate provision of their services. Thus, the energy usage data combined with personally identifiable information may be collected by the DR aggregators as well as by the utility. The DR aggregators may gather as much information as it wants, regardless of whether such information is needed for providing services. A similar concern may be raised if services are outsourced to a third party and customers do not have direct control over data sharing.

Accordingly, some embodiments discussed herein include a customer-centric framework to manage, store, and share the energy usage data in a privacy-enhanced way. Some embodiments include a mechanism to enable customers to flexibly control the amount of energy usage information disclosed while allowing third party service providers to be convinced of the authenticity of data. Implementation may be via an enhanced Green Button data scheme. Some embodiments may be implemented without installing an additional metering device by the third party service provider, which may allow the customers to have more control of data disclosure. This and other embodiments are described with reference to the appended drawings.

Figure 1A:
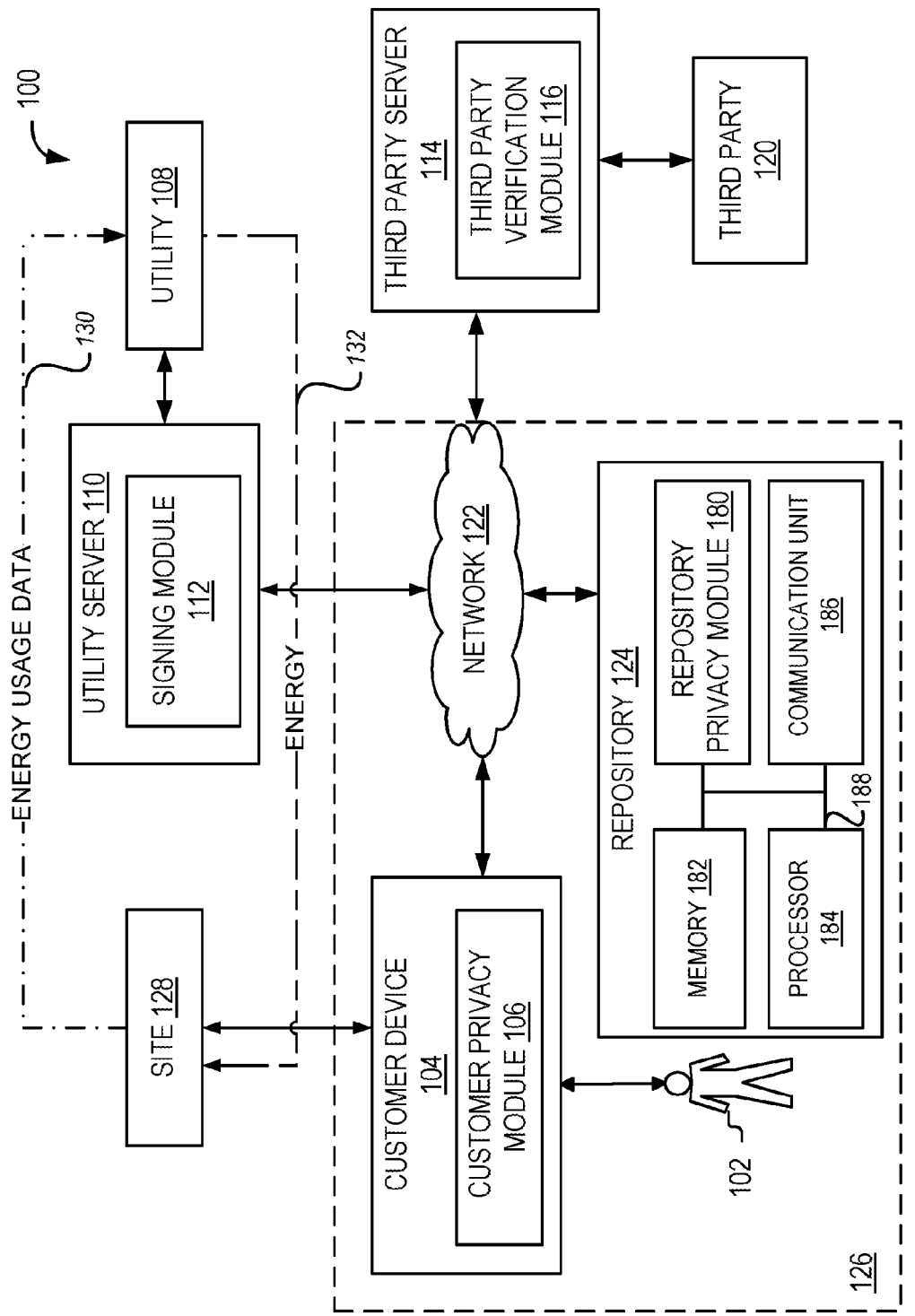
FIG. 1A illustrates block diagrams of an example system in which energy usage data, such as electrical energy usage data, may be communicated.
Figure 1B:
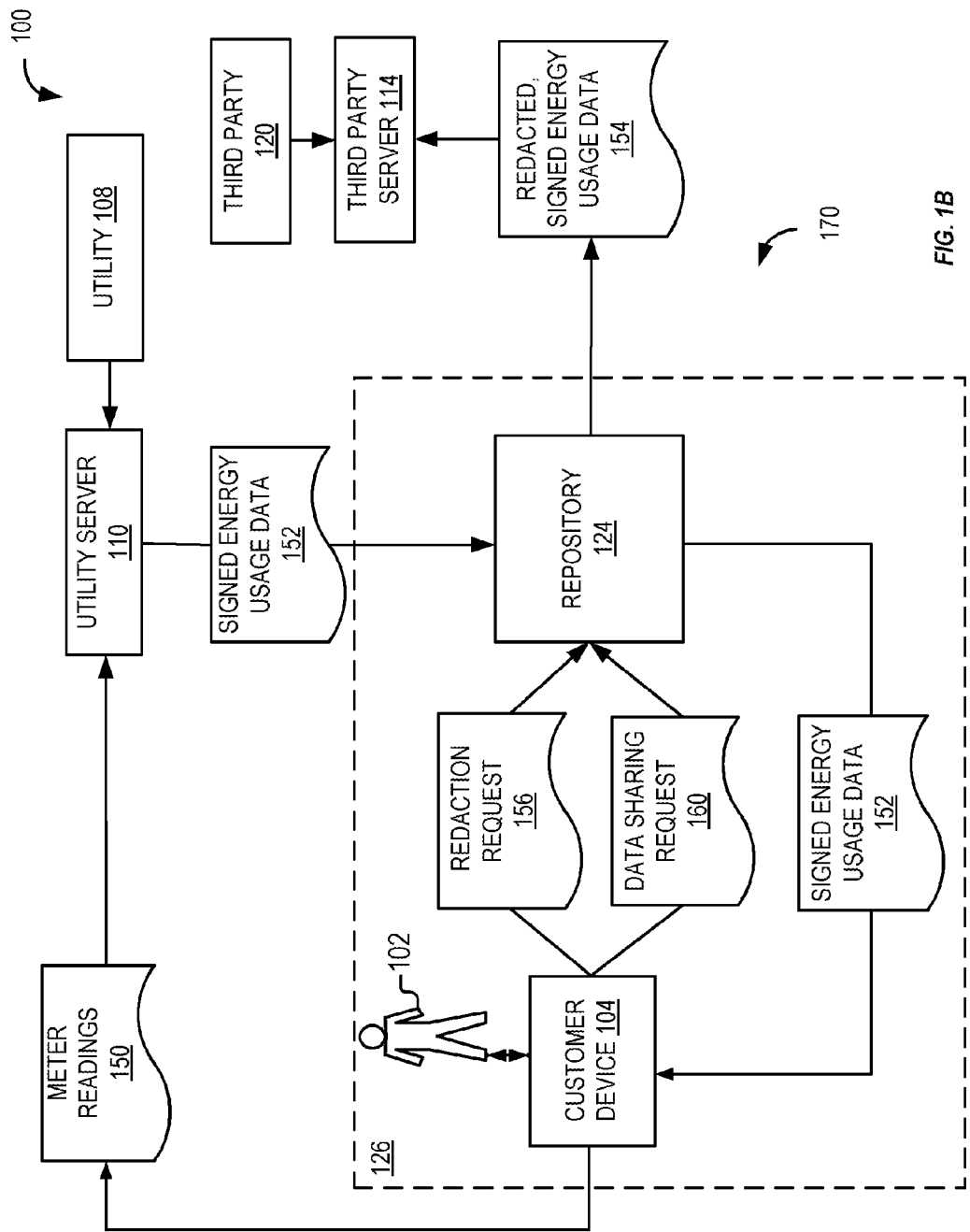
FIG. 1B illustrates an example management of energy usage data in the system of FIG. 1A.

FIGS. 1A and 1B illustrate block diagrams of an example system 100 in which energy usage data may be communicated. For example, the energy usage data may be communicated to a third party 120 such that a service may be performed based on the energy usage data. In the system 100, energy usage data may be generated that indicates energy usage at a site 128. For example, the energy usage data may be representative of electrical energy usage at the site 128. The site 128 may be associated with a customer 102 and may result from actions performed by the customer 102. Accordingly, the energy usage data may present privacy concerns to the customer 102 because behaviors and actions of the customer 102 may be derived from the energy usage data. For example, a particular appliance the customer 102 uses at a particular time may be derived from the energy usage data.

The system 100 may be configured as a customer-centric system in which the customer 102 has control over the energy usage data generated at the site 128. For example, the system 100 may include a customer domain 126. The customer domain 126 may include a customer device 104, a repository 124 or some portion thereof, and some portion of a network 122. When the energy usage data is in the customer domain 126, the customer 102 may at least partially control the energy usage data. For example, the customer 102 may control which portions of the energy usage data are viewable or private and/or which entities (e.g., a third party 120) have access to the energy usage data.

In the system 100, the customer 102 may have an incentive to provide the energy usage data, or some portion thereof, to the third party 120. For example, the third party 120 may include a service provider that assesses the energy usage data to determine whether the customer 102 receives an incentive for energy efficiency or demand response contribution. Prior to communication of the energy usage data, the customer 102 may redact portions thereof to limit availability of the energy usage data that may introduce privacy issues.

However, there may be a limit to an amount of the energy usage data that the customer 102 may redact. Specifically, a permitted redaction of the energy usage data may not be so extensive that the third party 120 is unable to evaluate the modified energy usage data. The third party 120 may have an interest in receiving at least an amount of the energy usage data involved in performing a service. For example, in some embodiments the third party 120 may include a DR aggregator. The DR aggregator may assess energy usage at the site 128 during a DR event to ascertain whether the customer fulfilled an energy curtailment amount. The DR aggregator may accordingly have an interest in receiving the energy usage data from a time period that includes the DR event and/or some historical energy usage data.

Additionally, the third party 120 may want an indication as to what portions of the energy usage data are redacted. This may reduce incomplete or fraudulent energy usage data. For example, to receive an incentive for participation in a DR event, the customer 102 may curtail energy usage at the site 128 by a particular amount. The third party 120 may be hired to evaluate whether the customer 102 fulfilled the curtailment amounts. Incomplete energy usage data may include energy usage data that simply deletes data indicating that the customer 102 did not curtail the particular amount of energy. The third party 120 may return an error to the customer 102 indicating that there is insufficient data to assess curtailment.

Moreover, the third party 120 may want assurances as to the validity and/or source of the modified data. In the system 100, a utility 108 may provide energy to the site 128 and collect energy usage data using a smart meter. Thus, the third party 120 may want assurances that a source of the energy usage data is the utility 108 and that the energy usage data has not been tampered with prior to being communicated to the third party 120.

In the system 100, a data structure may be employed that allows the customer 102 to redact portions of the energy usage data while enabling the third party 120 to verify a source of the energy usage data and to authenticate accuracy of the energy usage data including redacted. In some embodiments discussed herein, the data structure employed may include a modified Merkle hash tree. The modified Merkle hash tree may generally enable generation of redactable signatures that allow verification and authentication of the energy usage data with redacted portions.

In some embodiments, use of the modified Merkle hash tree may be performed at least partially as discussed in U.S. patent application Ser. No. 13/942,995, entitled "Customer-Centric Energy Usage Data Sharing" filed Jul. 16, 2013, which is incorporated herein by reference in its entirety. For example, some embodiments described herein may include a redactable digital signature scheme described therein.

The system 100 depicted in FIG. 1A may include the utility 108, the third party 120, the site 128, the repository 124, and the customer 102. The utility 108 may be associated with a utility server 110, the customer 102 may be associated with the site 128, and the customer device 104, and the third party 120 may be associated with a third party server 114. The term "associated with" may indicate that the entity and/or the customer 102 owns or otherwise controls, directly or indirectly, the server (110 or 114) or the site 128 and the customer device 104. For example, the third party server 114 may be controlled by the third party 120. In addition, the site 128 and the customer device 104 may be controlled by the customer 102. Accordingly, communications with and actions attributed to the customer 102 may occur at the customer device 104. Similarly, communications with and actions attributed to the third party 120 may occur at the third party server 114.

In the system 100, data sets including energy usage data or portions thereof as well as other messages and information may be communicated between the utility server 110, the third party server 114, the repository 124, and the customer device 104 via the network 122. The network 122 may be wired or wireless, and may have numerous configurations including a star configuration, token ring configuration, or other configurations. The network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols. In some embodiments, the network 122 may include BLUETOOTH® communication networks and/or cellular communication networks for sending and receiving data via short messaging service (SMS), multimedia messaging service (MMS), hypertext transfer protocol (HTTP), direct data connection, wireless application protocol (WAP), e-mail, etc.

In the system 100, the utility 108 may distribute energy (e.g., electricity) to the site 128. The distribution of the energy by the utility 108 to the site 128 is denoted in FIG. 1A at 132. Additionally, the utility 108 may collect energy usage data from the site 128. The collection of energy usage data is denoted in FIG. 1A at 130. The utility 108 may include any entity involved in production, transmission, and/or distribution of electricity. The utility 108 may be publicly owned or may be privately owned. Some examples of the utility 108 may include a power plant, an energy cooperative, and an independent system operator (ISO).

In some embodiments, the third party 120 (discussed elsewhere herein) may include a DR aggregator and the energy usage data may be communicated between the customer 102, repository 124, and the third party server 114 at least partially for assessment of energy usage in a context of a DR event. In these and other embodiments, the utility 108 may set terms for DR events. For example, the utility 108 may set an incentive exchange for participation in the DR event, a time period of the DR event, a duration of the DR event, and an energy usage curtailment for the DR event. The terms of the DR events may be communicated to the customer 102 via the customer device 104 and/or the third party 120 via the third party server 114.

Additionally, one or more of the embodiments discussed herein may be utilized in other systems in which data other than energy usage data may be communicated between customers 102 or other data subjects and third parties. In these embodiments, the utility 108 may more generally be an entity that signs or otherwise initially authenticates the data prior to redaction by the customer 102 or another data subject.

The site 128 may include buildings, structures, equipment, or other objects that use electricity distributed by the utility 108. The site 128 may have adapted thereto a meter such as a smart meter that measures the energy distributed to the site 128. The meter may communicate the energy usage data to the utility 108. In some embodiments, the energy usage data may be communicated to the utility 108 via the network 122. Based on the energy usage data, the utility 108 may ascertain the energy usage of the site 128, which may be used to bill the customer 102, for example. In embodiments in which data other than energy usage data is communicated, the site 128 may be omitted. Additionally or alternatively, in these and other embodiments, the customer device 104 and the site 128 and/or one or more characteristics or functions attributed thereto may be combined.

The utility server 110 associated with the utility 108 may include a hardware server that includes a processor, a memory, and network communication capabilities. In the illustrated embodiment, the utility server 110 may be coupled to the network 122 to send and receive data to and from the customer device 104, the repository 124, and the third party server 114 via the network 122.

The utility server 110 may include a signing module 112. The signing module 112 may include code and routines for privacy-preserving communication described herein. In some embodiments, the signing module 112 may be implemented using hardware including a field-programmable gate array (FPGA) or an application-specific integrated circuit (ASIC). In some other instances, the signing module 112 may be implemented using a combination of hardware and software.

The signing module 112 may be configured to receive the energy usage data from a metering device or another suitable data measuring system at the site 128. The energy usage data received at the signing module 112 may include data representative of energy usage as a function of time. The signing module 112 may use a data structure such as the modified Merkle hash tree to enable the customer 102 to redact portions of the energy usage data while enabling the third party 120 to verify a source of the energy usage data and authenticate the energy usage data received from the customer 102.

In embodiments implementing the modified Merkle hash tree, the signing module 112 may calculate a root hash of the modified Merkle hash tree, which may be signed using a private key of the utility 108. The root hash may be calculated based on a per-customer key that is unique to the customer, a keyed hash function, an initialization vector, and a counter. One or more of the keyed hash function, the initialization vector, and the per-customer key, may be included with the energy usage data such that the modified Merkle hash tree may be reconstructed and/or portions of the energy usage data may be redacted.

The customer 102 may include individuals, groups of individuals, or other entities, for example. The site 128 and the customer device 104 may be associated with the customer 102. In some embodiments, the customer 102 may determine which portions of the energy usage data to redact.

The customer device 104 associated with the customer 102 may include a computing device that includes a processor, memory, and network communication capabilities. For example, the customer device 104 may include a laptop computer, a desktop computer, a tablet computer, a mobile telephone, a personal digital assistant ("PDA"), a smartphone, a mobile e-mail device, a portable game player, a portable music player, a television with one or more processors embedded therein or coupled thereto, or other electronic device capable of accessing the network 122.

The customer device 104 may include a customer privacy module 106. The customer privacy module 106 may include code and routines for privacy-preserving communication. In some embodiments, the customer privacy module 106 may act in part as a thin-client application that may be stored on a computing device (e.g., the customer device 104) and in part as components that may be stored on other computing devices such as the third party server 114, the repository 124, and the utility server 110, for instance. In some embodiments, the customer privacy module 106 may be implemented using hardware including an FPGA or an ASIC. In some other instances, the customer privacy module 106 may be implemented using a combination of hardware and software.

In some embodiments, for example those in which the system 100 is used in the context of DR events, OpenADR may be used. To support OpenADR, the customer device 104 may be equipped with an OpenADR client software (e.g., VEN or Virtual End Node) with additional functionality for interacting with the repository 124, which may automate one or more steps in the processes described herein.

The repository 124 may receive energy usage data from the utility server 110. The customer privacy module 106 may be configured to download or otherwise access the energy usage data from the repository 124. The customer privacy module 106 may enable the customer 102 to view the energy usage data. Additionally, the customer privacy module 106 may enable selection by the customer 102 of portions of the energy usage data to redact.

The customer privacy module 106 may additionally or alternatively be included in a repository privacy module 180 or hosted by the repository 124. In these and other embodiments, the customer device 104 may act as a front end device, which may be used to access the customer privacy module 106 and/or information communicated to the customer privacy module 106. For example, the customer privacy module 106 may be run in a browser, which may provide an interface through which the customer 102 may interface with the customer privacy module 106.

The third party 120 may include a service provider or any other entity that has an interest in receiving or may be provided the energy usage data. The third party 120 may include any service provider. For example, the third party 120 may be commissioned or otherwise hired to evaluate the energy usage data by the customer 102 and/or the utility 108; a commercial entity interested in energy markets, prevalence/usage of energy system equipment, advertising; a governmental regulator; a private regulator; and the like.

In some embodiments, the third party 120 may not be fully trusted by the customer 102 and/or the utility 108. In these and other embodiments, to minimize privacy concerns, energy usage data disclosure in the system 100 to the third party 120 may be minimized. For example, the energy usage data may be modified such that only data involved in performance of a service may be communicated to the third party 120.

The third party 120 may be associated with the third party server 114. The third party server 114 may include a hardware server that includes a processor, memory, and communication capabilities. In the illustrated embodiment, the third party server 114 may be coupled to the network 122 to send and receive information to and from the customer device 104 and/or the utility server 110 via the network 122.

In the depicted embodiment, the third party server 114 may include a data verification module 116. The data verification module 116 may include code and routines for privacy-preserving communication described herein. In some embodiments, the data verification module 116 may be implemented using hardware including an FPGA or an ASIC. In some other instances, the signing module 112 may be implemented using a combination of hardware and software.

The data verification module 116 may be configured to request certain energy usage data from the customer device 104, the customer 102, or the repository 124. For instance, the data verification module 116 may be configured to request the certain energy usage data from the repository privacy module 180. In these embodiments, the customer 102 may then receive the request by interfacing with the repository privacy module 180 via the customer device 104.

The certain energy usage data requested by the third party 120 may include data from a particular time period. For example, the particular time period may include a time period corresponding to a DR event, a time period before and/or after a DR event, a historical time period for a baseline calculation, a time period since an occurrence (e.g., since installation of a heater or air-conditioning unit), a time period corresponding to a specific occurrence (e.g., energy usage data for days during a particularly warm period), a time period during a particular period (e.g., from 1:00 PM to 3:00 PM from June and July of 2013), or any other certain energy usage data.

The certain energy usage data from the DR event may be used as a basis for an evaluation. For example, in embodiments in which the third party 120 includes a DR aggregator, the energy usage data may be used to determine whether the customer 102 is in compliance with the DR event.

The data verification module 116 may be configured to receive the energy usage data that includes one or more redacted portions. After the energy usage data is received, the data verification module 116 may reconstruct a data structure used to enable generation of redactable signatures on the energy usage data. Based on the reconstructed data structure, the data verification module 116 may verify a source of the energy usage data and/or authenticate the energy usage data.

In some embodiments, the modified Merkle hash tree may be used to enable generation of redactable signatures on the energy usage data. By reconstructing the modified Merkle hash tree, hash values of nodes of the modified Merkle hash tree may be calculated and the signature of the utility 108 may be verified. Thus, the energy usage data may be authenticated and verified with redacted portions. In these and other embodiments, the data verification module 116 may be configured to calculate a root hash value and verify a root hash value against a signature of the utility 108. In some embodiments, one or more of the keyed hash function, the initialization vector, and the per-customer key, may be included with the energy usage data such that the modified Merkle hash tree may be reconstructed. In addition, the third party verification module 116 may access a public key to verify the signature of the utility 108 on the root node.

The repository 124 may include any storage device or storage server that may be capable of communication via the network 122. The repository 124 may allow the energy usage data to be stored at least temporarily therein. The energy usage data may then be accessed. For example, the utility 108 may communicate the energy usage data collected from the site 128 to the repository 124. The customer device 104 may then download the energy usage data or a portion thereof from the repository 124. The customer 102 may browse and/or process the downloaded energy usage data on the repository 124. Additionally or alternatively, the energy usage data may be downloaded by the customer 102 and then uploaded to the repository 124 by the customer 102.

In some embodiments, the repository 124 may include the repository privacy module 180, a memory 182, a processor 184, and a communication unit 186. The repository privacy module 180, the memory 182, the processor 184, and the communication unit 186 may be coupled via a bus 188.

The processor 184 may include an arithmetic logic unit (ALU), a microprocessor, a general-purpose controller, or some other processor array to perform computations. The processor 184 may be coupled to the bus 188 for communication with the other components. The processor 184 generally processes data signals and may include various computing architectures including a complex instruction set computer (CISC) architecture, a reduced instruction set computer (RISC) architecture, or an architecture implementing a combination of instruction sets. Although FIG. 1A includes a single processor 184, multiple processors may be included in the repository 124 in which the multiple processors may be configured to perform individually or collectively one or more of the operations described herein.

The memory 182 may be configured to store instructions and/or data that may be executed by the processor 184. The memory 182 may be coupled to the bus 188 for communication with the other components. The instructions and/or data may include code for performing the techniques or methods described herein. The memory 182 may include a dynamic random access memory (DRAM) device, a static random access memory (SRAM) device, flash memory, or some other memory device. In some embodiments, the memory 182 may also include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 186 may be configured to transmit and receive data to and from the customer device 104, the utility server 110, and the third party server 114. The communication unit 186 may be coupled to the bus 188. In some embodiments, the communication unit 186 may include a port for direct physical connection to the network 122 or to another communication channel. For example, the communication unit 186 may include a universal serial bus (USB), a standard definition (SD) port, category (CAT)-5 port, or similar port for wired communication with the components of the system 100. In some embodiments, the communication unit 186 includes a wireless transceiver for exchanging data via communication channels using one or more wireless communication methods, including IEEE 802.11, IEEE 802.16, BLUETOOTH®, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), or another suitable wireless communication method.

In some embodiments, the communication unit 186 includes a cellular communications transceiver for sending and receiving data over a cellular communications network including via SMS, MMS, HTTP, direct data connection, WAP, e-mail, or another suitable type of electronic communication. In some embodiments, the communication unit 186 includes a wired port and a wireless transceiver. The communication unit 186 may also provide other conventional connections to the network 122 for distribution of files and/or media objects using standard network protocols including transmission control protocol/internet protocol (TCP/IP), HTTP, HTTP-secure (HTTPS), and simple mail transfer protocol (SMTP), etc.

The repository privacy module 180 may include code and routines for privacy-preserving communication. In some embodiments, the repository privacy module 180 may act in part as a thin-client application that may be stored on a computing device (e.g., the customer device 104) and in part as components that may be stored on other computing devices such as the third party server 114, the repository 124, and the utility server 110, for instance. In some embodiments, the repository privacy module 180 may be implemented using hardware including an FPGA or an ASIC. In some other instances, the repository privacy module 180 may be implemented using a combination of hardware and software.

The repository privacy module 180 may be configured to receive or access the energy usage data via the network 122. The repository privacy module 180 may be further configured to receive input of the customer 102 via the customer device 104 effective to select data of the energy usage data. In some embodiments, the input of the customer 102 may include a redaction request indicating what data to redact. Additionally or alternatively, the input of the customer 102 may include a policy selection, which may set a privacy level forming a basis of data selected by the repository privacy module 180 for redaction.

In response to the input of the customer 102, the repository privacy module 180 may parse the energy usage data and redact the data from the energy usage data according to the customer input. The repository privacy module 180 may then reconstruct the energy usage data such that the energy usage data is verifiable and authenticatable by the third party 120. For example, redaction of the data may include removing the data from the energy usage data or obscuring the data such that the data cannot be ascertained from the energy usage data. The repository privacy module 180 may then replace the redacted data with another value such as a hash value. The hash value may enable the third party 120 to verify and authenticate energy usage data having one or more data values redacted.

In some embodiments, the modified Merkle hash tree may be used to enable generation of redactable signatures used to authenticate and verify the energy usage data. In these and other embodiments, one or more of the keyed hash function, the initialization vector, and the per-customer key, may be used to calculate hash values used in the modified Merkle hash tree.

In some embodiments, the repository privacy module 180 may perform one or more functions described above with respect to the data verification module 116. For example, the repository privacy module 180 may be configured to receive energy usage data. After the energy usage data is received, the repository privacy module 180 may reconstruct a data structure used to enable generation of redactable signatures on the energy usage data. Based on the reconstructed data structure, the repository privacy module 180 may verify a source of the energy usage data.

In some embodiments, the modified Merkle hash tree may be used to enable generation of redactable signatures on the energy usage data. By reconstructing the modified Merkle hash tree, hash values of nodes of the modified Merkle hash tree may be calculated and the signature of the utility 108 may be verified. Thus, the energy usage data may be verified. In these and other embodiments, the repository privacy module 180 may be configured to calculate a root hash value and verify a root hash value against a signature of the utility 108.

The repository 124 is depicted separate from the customer device 104, the third party server 114, and the utility server 110, but is not limited to such an implementation. For example, in some embodiments, the repository 124 may include a storage module hosted on the customer device 104 and/or the utility server 110. Additionally or alternatively, the repository 124 may be included in or hosted by a trusted entity. In some embodiments, access to the energy usage data may be via a website, a computer application (e.g., a mobile application), or via a browser-based interface.

With reference to FIG. 1A, in the system 100 the utility 108 may distribute energy (e.g., electricity) to the site 128. Accordingly, data modified and communicated in the system 100 may include energy usage data. In some embodiments, the utility 108 may provide another resource such as natural gas or water to the site 128. Thus, in these embodiments, the data modified and communicated may include other types of data related to the resource, such as resource consumption.

One or more embodiments may be integrated into a customer-centric DR aggregation service, for example. Additionally, one or more embodiments may be integrated into other applications, besides DR aggregation services, that may be implemented on top of one or more embodiments of a customer-centric model discussed herein. Some services, such as sophisticated recommendation services, may use statistical or machine-learning techniques, which may include different privacy-preservation schemes. Another direction may include implementation of one or more disclosed embodiments in a user interface that assists customers' decision making to appropriately balance privacy and enable or assist the customers to benefit from services.

Moreover, some embodiments may be applicable in other systems or environments. While the system 100 depicted in FIG. 1A includes communication of energy usage data, the system 100 is a particular example of an environment in which data may be communicated using the modified Merkle hash tree as described herein or similar data structure. The utility 108 may be a particular example of a data issuer or a data source that may be implemented in the environment. The third party 120 may be a particular example of a data verifier that may be implemented in the environment. The customer 102 may be a particular example of a data subject that may be implemented in the environment. For example, similar processes may be used for privacy preservation in environments in which there is sensitive time-series data such as personal wearable devices, medical diagnostics, automotive or vehicle data, insurance company communications, and the like.

Modifications, additions, or omissions may be made to the system 100 without departing from the scope of the present disclosure. Specifically, embodiments depicted in FIG. 1A include one customer 102, one customer device 104, one repository 124, one site 128, one utility 108, one utility server 110, one third party 120, and one third party server 114. However, the present disclosure applies to systems that may include one or more of the customers 102, one or more of the customer devices 104, one or more of the repositories 124, one or more of the sites 128, one or more of the utilities 108, one or more of the utility servers 110, one or more of the third parties 120, one or more of the third party servers 114, or any combination thereof.

Moreover, the separation of various components in the embodiments described herein is not meant to indicate that the separation occurs in all embodiments. It may be understood with the benefit of this disclosure that the described components may be integrated together in a single component or separated into multiple components.

In the system 100, memory in the customer device 104, the utility server 110, and the third party server 114 may be substantially similar to the memory 182. Processors in the customer device 104, the utility server 110, and the third party server 114 may be substantially similar to the processor 184. Additionally, one or more of the customer devices 104, the utility server 110, and the third party server 114 may include a communication unit substantially similar to the communication unit 186.

FIG. 1B illustrates an example customer-centric system architecture 170 for the system 100. FIG. 1B further illustrates an example privacy-preserving management of energy usage data (e.g., 150, 152, 154, 156, and 160) in the system 100. The management depicted in the system architecture 170 includes one or more entities (e.g., 102, 108, 120, and 124) of FIG. 1A and illustrates an example flow of information among the entities.

Energy usage data may originate at the customer 102 (e.g., at the site 128 associated with the customer 102). The energy usage data may include meter readings 150. In some embodiments, the meter readings 150 may be sent periodically (e.g., at 15-minute intervals) or in real time to the utility 108. The meter readings 150 may be communicated to the utility 108 regardless of whether the customer 102 and/or the third party 120 are interested in the energy usage data.

The customer 102 using the customer device 104 and/or the repository 124 may periodically download the energy usage data from the utility 108. Additionally or alternatively, the repository 124 may periodically or automatically download the energy usage data from the utility server 110 on behalf of the customer 102. The energy usage data downloaded from the utility server 110 may include signed energy usage data 152.

The signed energy usage data 152 may include the energy usage data metadata associated with the energy usage data, information sufficient to reconstruct a modified Merkle hash tree used to enable verification and authentication of the signed energy usage data 152, or some combination thereof. For example, the signed energy usage data 152 may include information and data sufficient to verify a digital signature of the utility 108 on a root node of the modified Merkle hash tree and to enable reconstruction of the modified Merkle hash tree. The signed energy usage data 152 generally includes a data of the energy usage data (e.g., none of the data is redacted).

By including a signature in the signed energy usage data 152, the third party 120 or any other party that knows and trusts a public key of the utility 108 may be convinced that the signed energy usage data 152 has been provided by the utility server 110 and/or has not been fraudulently tampered with by the customer 102. The utility 108 may be issued a digital certificate from a trusted Certification Authority (CA), and the utility 108 may post the digital certificate publicly such as on a website of the utility 108.

The signed energy usage data 152 may be stored, at least temporarily, on the repository 124. The customer 102 using the customer device 104 may access and/or browse the signed energy usage data 152 stored on the repository 124. In some embodiments, the customer device 104 may access and/or browse the signed energy usage data 152 at any time. The access and/or control over the repository 124 may be possible via a dedicated client software and/or a web browser (e.g., the customer privacy module 106 and/or the repository privacy module 180 of FIG. 1A).

Using the customer device 104, the customer 102 may issue a data sharing request 160 to the repository 124. For example, at times in which the customer 102 intends to share some energy usage data with the third party 120, the customer 102 may use the customer device 104 to issue the data sharing request 160 to the repository 124.

In embodiments such as those in which the third party 120 includes a DR aggregator, the data sharing request 160 may be related to event information communicated to the customer device 104 by the utility server 110 or the third party server 114. The event information may include DR event duration, curtailment amounts, and the like. The event information may be communicated a day ahead, or a few hours ahead, for instance. Additionally or alternatively, the event information may also be communicated to the third party server 114. In response, the third party server 114 may also communicate an information request (not shown) that may indicate to the customer 102 a particular time period to include in the energy usage data communicated to the third party server 114. The particular time period may include during the DR event and historical energy usage data.

In response to the data sharing request 160 being issued by the customer device 104, a redacted signed energy usage data (redacted data) 154 may be generated. The redacted data 154 may include the signed energy usage data 152 with portions (e.g., specific or selected data) redacted. For instance, the portions of the signed energy usage data 152 that introduce a privacy issue to the customer may be redacted from the energy usage data 152. Additionally or alternatively, all portions of the signed energy usage data 152 may be redacted other than the data involved in a service provided by the third party server 114.

In some embodiments, the repository 124 may generate the redacted data 154. The redacted data 154 may be based on a pre-selected privacy policy. For example, using the customer device 104, the customer 102 may select a low level of privacy in which only portions of the signed energy usage data 152 including a particular pattern may be redacted. Additionally or alternatively, the redacted data 154 may include a minimal disclosure form of the signed energy usage data 152 provided by the utility 108 based on the data sharing request 160.

In some embodiments, the customer 102 may view the signed energy usage data 152 using the customer device 104. The customer 102 may then select portions of the signed energy usage data 152 to redact using the customer device 104. The customer device 104 may communicate a redaction request 156 to the repository 124. The redaction request 156 may include the one or more portions of the signed energy usage data 152 that the customer 102 wishes to redact. For example, using the customer device 104, the customer 102 may redact the portions thought to be irrelevant to a service performed by the third party 120 and/or the portions that may introduce a privacy issue to the customer 102. Based on the redaction request 156, the repository 124 may generate the redacted data 154.

The redacted data 154 may then be communicated to the third party server 114. Based on the redacted data 154 and one or more other pieces of information, the third party server 114 may reconstruct a modified Merkle hash tree configured to enable verification and authentication of the redacted data 154. For example, despite the redacted portions, the third party 120 may ensure the energy usage data accurately represents energy usage over a particular time period. Based on the redacted data 154, the third party 120 may perform an analysis. Additionally, after the modified Merkle hash tree is reconstructed, the third party server 114 may verify the signature of the utility 108. Verifying the signature may allow the third party 120 to protect against malicious or fraudulent service requests.

In some embodiments, the utility 108 or the utility server 110 may still have access to the signed energy usage data 152. The utility 108 or the utility server 110 may use signed energy usage data 152 for prediction, anomaly detection, and the like. In some circumstances, the customer 102 may agree to such access in advance. Thus, the system 100 may not affect a quality of services provided by the utility 108. Likewise, the customer device 104 may also have access to the signed energy usage data 152 to conduct data analytics. In some embodiments the repository 124 may include or support such functionality.

As mentioned above, a modified Merkle hash tree may be used for generation of redactable signatures used to verify and authenticate the energy usage data. The modified Merkle hash tree may be similar to a traditional Merkle hash tree. However, in the modified Merkle hash tree, hash values of the nodes may be calculated using a keyed hash function, a customer key, an initialization vector, a counter, or some combination thereof.

Figure 2:
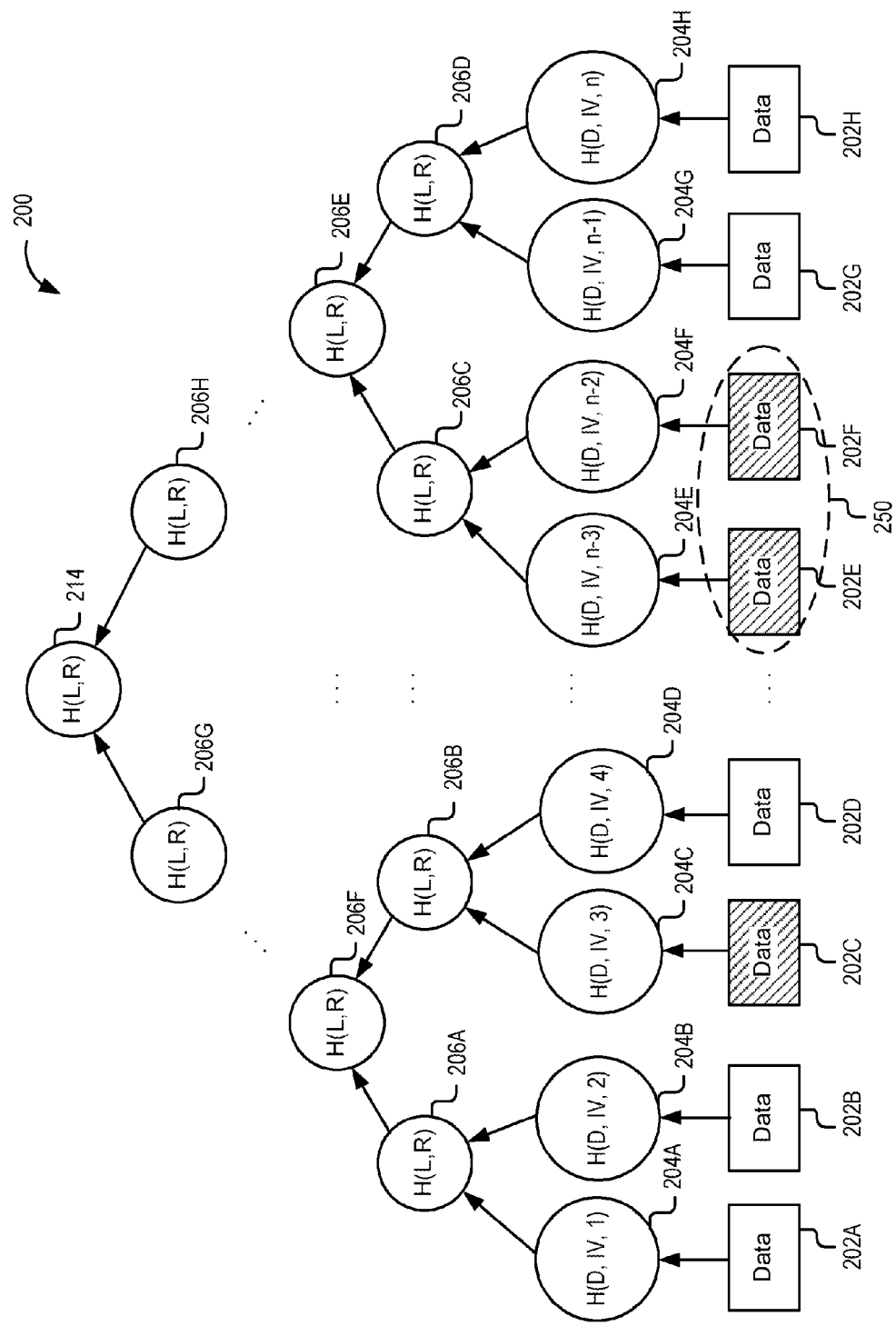
FIG. 2 illustrates an example modified Merkle hash tree that may be implemented in the system of FIGS. 1A and 1B.

For example, FIG. 2 depicts an example modified Merkle hash tree 200 that may be implemented in the system 100 of FIGS. 1A and 1B. The modified Merkle hash tree 200 may be used to throughout the system 100 of FIGS. 1A and 1B. For example, the utility 108 may construct the modified Merkle hash tree 200 to calculate a root hash value for a root node 214. A digital signature of the utility 108 may be made on the root hash value calculated for the root node 214. Additionally, the modified Merkle hash tree 200 may be used by the repository 124 and or the customer device 104 to replace redacted data from the energy usage data. Moreover, the modified Merkle hash tree 200 may be reconstructed by the third party server 114 from energy usage data with some portions redacted. Based on the reconstructed modified Merkle hash tree 200, the third party 120 may verify the source of the energy usage data (e.g., via the digital signature) and authenticate the non-redacted portions of the energy usage data (e.g., via the hash values corresponding to the redacted portions and the digital signature).

The modified Merkle hash tree 200 may be for a particular data set including energy usage data over a particular time period. Generally, the modified Merkle hash tree 200 includes a tree structure in which each node (214, 206, and 204) stores a hash of some data. The modified Merkle hash tree 200 may include a root node 214, parent nodes 206A-206H (generally, parent node 206 or parent nodes 206), leaf nodes 204A-204H (generally, leaf node 204 or leaf nodes 204), and data blocks 202A-202H (generally, data block 202 or data blocks 202). The root node 214 and the parent nodes 206 may also be referred to as non-leaf nodes 214/206.

The root node 214 and the parent nodes 206 may include hash values of their children nodes. For example, the root node 214 may include a hash value of a seventh parent node 206G and an eighth parent node 206H. Similarly, a first parent node 206A may include a hash value of a first leaf node 204A and a second leaf node 204B. In FIG. 2, H(L,R) included in the root node 214 and the parent nodes 206 represent a hash value of a left child node (L) and a right child node (R). The leaf nodes 204 may include a hash value of a corresponding data block 202. For example, a third leaf node 204C may include a hash value of a third data block 202C. In the depicted embodiment, each of the data blocks 202 includes a data value from the energy usage data and metadata of the data values. For example, each of the data blocks 202 may include an average energy usage value for a particular interval such as 10 kWh for 1:05 AM to 1:06 AM on Jan. 1, 2014. The data values in the data blocks 202 may be formatted in extensible markup language (XML) in some embodiments. Some examples of the metadata may include timestamp and units.

With combined reference to FIGS. 1A and 2, constructing and/or reconstructing the energy usage data such that the energy usage data is verifiable and authenticable may include calculating a hash value for the redacted data. In the system 100, the repository privacy module 180, the customer privacy module 106, the signing module 112, the third party verification module 116, or some combination thereof may calculate the hash value depending on which entity is interacting with the energy usage data. When a data value of one data block 202 is redacted, a hash value may be calculated at a corresponding leaf node 204. The hash value may replace the redacted data block 202 in the energy usage data. Additionally, a section of data blocks 250 may be redacted. The section of data blocks 250 may include at least two sequential data blocks 202 having a common parent 206. When a section of data blocks 250 are redacted, a hash value may be calculated at a common parent node 206. The hash value of the common parent node 206 may replace the section of data block 202 in the energy usage data.

For instance, if the data value from the third data block 202C is redacted (depicted in FIG. 2 as having a diagonal line pattern fill), then the repository privacy module 180 (or another module e.g., 112, 116, 106) may calculate a hash value of the third leaf node 204C. The hash value of the third leaf node 204C may replace the third data block 202C in the energy usage data. Additionally, if the data values from a fifth data block 202E and a sixth data block 202F, which have a common parent of the third parent node 206C, are redacted (again, depicted in FIG. 2 as having a diagonal line pattern fill), then the repository privacy module 180 may calculate a common hash value of the third parent node 206C. The hash value of the third parent node 206C may replace the section of data blocks 250 in the energy usage data.

In some embodiments, the hash value of the leaf nodes 204 may be calculated using a per-customer key that is unique to the customer 102, an initialization vector, and a counter. The per-customer key may prevent or reduce the likelihood of malicious third parties correlating hash values among multiple customers. Specifically, in some embodiments a keyed hash function (e.g., HMAC) may be utilized with a per-customer key for hash tree calculation. The per-customer key may be uniquely chosen for the customer 102 and may be shared with the utility 108 and with the third party 120 that is authorized to access the data. The utility 108 may use the per-customer key to construct the modified Merkle hash tree 200 and to calculate a hash value for the root node 214.

The third party 120 may also use the per-customer key to reconstruct the modified Merkle hash tree 200 and get the hash value for the root node 214, which may be verified using the public key of the utility 108. Additionally, the per-customer key may allow for different hash values for different customers even when a meter reading value (or a series of values) is identical.

In some embodiments, the per-customer key may include a key derived using a customer-chosen personal identification number (PIN), which may be utilized in a system of the utility 108 such that only the third party 120 that knows the PIN may access the energy usage data of the customer 102. In other embodiments, the per-customer key may not be used for data confidentiality, authentication, or access control.

The hash values may be calculated based on the initialization vector. The initialization vector may include a cryptographically secure random number. The initialization vector may be used to derive a new key for each of the data blocks 202 to be hashed. One initialization vector may be generated for each data set of the energy usage data that is signed by the utility 108. Within the data set of the energy usage data, the initialization vector may be incremented by the counter for each of the data blocks 202. For example, in the modified Merkle hash tree 200, a first leaf node 204A may include a counter equal to one, a second leaf node 204B may include a counter equal to two, etc. The initialization vector may be XOR'ed, for instance, with the per-customer key to derive a new key. The new key may ensure that no two data value or data blocks 202 in the same data set of energy usage data result in the same hash value. The counter may also prevent unauthorized reordering of the data values.

An example benefit of the initialization vector and/or the counter may include repulsion of bruit-force attacks. For example, even with the per-customer key, the same inputs in the same customer's energy usage data may provide the same output hash values. An adversary (not shown) may take advantage of the same output hash values to facilitate efforts to break privacy. For example, if the adversary sees the same hash value at the same level of the modified Merkle hash tree 200 multiple times, the adversary may not have to repeat brute-force calculations.

In some embodiments, the hash values of the leaf nodes 204 may be calculated according to a hash value equation:

$$H(D, IV, i) = M(D, (K \oplus (IV+i)));$$

In the hash value equation, a variable H represents the hash value for the data block. The variable D represents the data block of the data. In circumstances in which a data block is redacted, D represents the data block selected to be redacted. The variable IV represents the initialization vector. The variable i represents the counter. The variable K represents the per-customer key. The operator ⊕ represents an agreed-upon operator such as an XOR.

Additionally or alternatively, the common parent hash values of the parent nodes 206 or the root node 214 may be calculated according to a common hash value equation:

$$H_P(L,R) = M(L\|R, K);$$

In the common hash value equation, a variable $H_P$ represents the common parent hash value. A variable L represents a first hash value of a first child node. The variable R represents a second hash value of a second child node. The function M represents a keyed hash function such as hash-based message authentication code (HMAC) using the SHA-1 or another suitable hash function. The variable K represents the per-customer key. The operator ∥ represents a concatenation operator.

Calculating the hash values as described herein may provide some security benefits. For example, selecting a random initialization vector for the data set of the modified Merkle hash tree 200 and incrementing the initialization vector for each data block 202 may prevent or reduce the effectiveness of a brute-forcing adversary from obtaining the redacted data without looping through a range of estimated data values for each redacted data value. Additionally, to find two redacted data values that match a common parent hash value of them, an adversary may iterate through all possible combinations of the two data values, which may slow down the brute-force attack.

In some embodiments, the modified Merkle hash tree may include a binary Merkle hash tree. When using the binary Merkle hash tree, a number of redacted data blocks 202 represented by a node (e.g., 214, 206, and 204) may be some power of two. For instance, redaction of contiguous 19 data blocks 202 may be represented by the hash values: a first hash value for 16 data blocks 202, a second hash value for two data blocks 202, and a third hash value for one data block 202. Hash values representing few data blocks (e.g., one or two) may be susceptible to brute-force attacks. Therefore, in these and other embodiments, security may be improved when a large number of contiguous data blocks 202 are redacted.

For example, to obtain redacted data in some embodiments, an adversary may mount a brute-force attack for each redacted leaf node 204 individually to recover the redacted data value. When eight meter readings in a row are redacted, to reveal the series of data a brute-force attack may be mounted on all possible combinations of the eight data values. If the search space for each is narrowed down to 100 possibilities through some educated guess, about $100^8$ ($\approx 2^{53}$) attempts may be used before the eight redacted meter readings may be revealed.

In some embodiments, contiguous nodes (e.g., 214, 206, and 204) that are redacted may be aggregated into one or a small number of intermediate hash values in the modified Merkle hash tree 200. As a number of contiguous nodes (e.g., 214, 206, and 204) to be redacted increases, which may aggregate a larger number of redacted nodes into one or a small number of intermediate hash values, the more difficult it may become to retrieve the redacted data values. The difficulty in retrieving the redacted data values may be due, at least in part, to a calculation of the hash values substituted for redacted data values that include a larger number of data blocks 202.

In general, in embodiments in which the third party 120 is a service provider, the third party 120 may only use energy usage data from a few hours in a day, which may enable the customer 102 to redact large portions of the energy usage data. Accordingly, a number of consecutive values redacted may be large enough to make a brute-force attack infeasible. A shorter metering interval for the same time duration may also strengthen the security.

Figure 3:
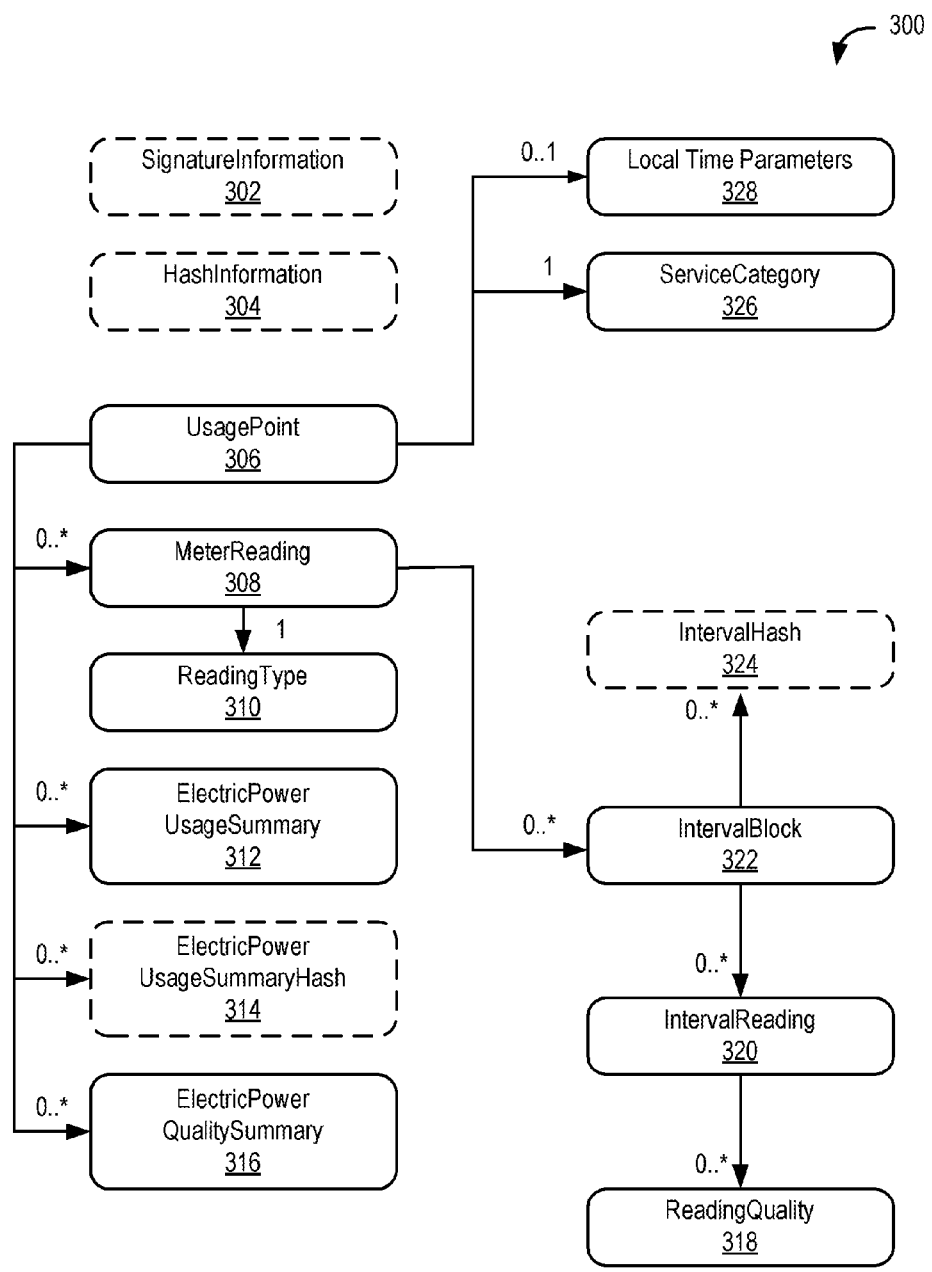
FIG. 3 illustrates an example enhanced Green Button scheme that may be implemented in data communication systems such as the system of FIGS. 1A and 1B.

FIG. 3 illustrates an example enhanced Green Button scheme 300 that may be implemented in the system 100 of FIGS. 1A and 1B. The enhanced Green Button scheme 300 may be based on the Green Button data model. Green Button generally includes a customer-centric approach to sharing energy usage data. Some additional information regarding Green Button may be found at www.greenbuttondata.org, the contents of which are incorporated herein by reference in its entirety.

The enhanced Green Button scheme 300 may be formatted in XML. Additionally, the enhanced Green Button scheme 300 may specify an XML data structure for storing and communicating energy usage data. The enhanced Green Button scheme 300 includes multiple classes (302, 304, 306, 308, 310, 312, 314, 316, 328, 326, 324, 322, 320, and 318). Example relationships between the classes in the enhanced Green Button scheme 300 are illustrated in FIG. 3.

The enhanced Green Button scheme 300 illustrates new classes (e.g., 302, 304, 324, and 314) along with classes (e.g., 306, 308, 310, 312, 316, 328, 326, and 322) which may exist in a conventional Green Button scheme. A subset of the classes is described herein to illustrate one or more enhanced features of the enhanced Green Button scheme 300. Additionally, details of the classes may include one or more of the characteristics and functionality as described at www.greenbuttondata.org. A first class 306 may include UsagePoint. The first class 306 may include a root element of a data model. The first class 306 may include a logical point on a smart grid network at which consumption may be physically measured (e.g., metered) or estimated (e.g., unmetered street lights).

A second class 312 may include ElectricPowerUsageSummary. The second class 312 may include a summary of electric power usage. For example, the second class 312 may include billing period, total cost of the current billing period, cost during the previous billing period, data related to last year's consumption, and the like. A third class 308 may include MeterReading. The third class 308 may represent a meter at a usage point represented by the first class 306. The third class 308 may not contain any data and links, the first class 306 UsagePoint with energy usage data values from a meter.

A fourth class 310 may include ReadingType. The fourth class 310 may specify characteristics associated with the readings included in the third class 308. The fourth class 310 may include the unit of the data values (e.g., kWh), the currency type associated with the cost, the quality of the reading, etc. A fifth class 322 may include IntervalBlock. The fifth class 322 may contain a set of readings, arranged in a time sequence of the same fourth class 310 (ReadingType).

A sixth class 320 may include IntervalReading. The sixth class 320 may specify a value measured by the meter or another asset. The sixth class 320 may include the cost; value in units, which may be specified in the fourth class 310 (ReadingType); and date and duration of the reading.

Former versions of Green Button may be configured for information exchange. Therefore, former versions of Green Button define only a data model. Accordingly, authenticity, verification, and privacy preservation are not within a scope of the former versions of Green Button. Additionally, the concept of a digital signature is not part of the former versions of Green Button, especially a digital signature with limited sharing.

The enhanced Green Button scheme 300 includes an additional four enhanced data classes 302, 304, 314, and 324. A first enhanced data class 302 includes SignatureInformation. The first enhanced data class 302 may contain a signature of the root node of the Merkle hash tree (e.g., a customizable modified Merkle hash tree 200 of FIG. 2). The first enhanced data class 302 may specify an algorithm used to create the signature (e.g., SHA1 with RSA). FIG. 4A represents an example of the first enhanced data class 302 according to some embodiments.

A second enhanced data class 304 includes HashInformation. The second enhanced data class 304 may include information about the hash algorithm used to construct the modified Merkle hash tree. The second enhanced data class 304 may additionally include the algorithm used to create the digest (e.g., HmacSHA1) and/or the initialization vector value for the data set. FIG. 4B represents an example of the second enhanced data class 304 according to some embodiments.

A third enhanced data class 314 includes ElectricPowerUsageSummaryHash. The third enhanced data class 314 may contain the hash value of one or more power usage summary elements. The summary of the usage data may be sensitive and a customer may have an option of hiding the summary from a third party such as the third party 120 of FIGS. 1A-2, if desired. The element may be present if the summary element has been redacted. FIG. 4C represents an example of the third enhanced data class 314 according to some embodiments.

A fourth enhanced data class 324 may include IntervalHash. The fourth enhanced data class 324 may contain a hash value used for the modified Merkle hash tree calculation when a customer wants to hide a certain portion of the included energy usage data from non-trusted parties. The fourth enhanced data class 324 may also contain the time and duration of the redacted energy usage data represented by the hash value and the number of blocks hidden by the hash. FIG. 4D represents an example of the fourth enhanced data class 324 according to some embodiments.

The additional information included in the fourth enhanced data class 324 may be used to determine a location of the corresponding hash value in the modified Merkle hash tree. Additionally, the additional information may be useful in reconstructing the modified Merkle hash tree for data verification and authentication.

In embodiments including the enhanced Green Button scheme 300, to prevent or inhibit malicious parties from modifying any sections of the data set such as a value included in the first class 306 (e.g., a UsagePoint value), the data may be included in a Green Button XML file in the modified Merkle hash tree calculation as leaf nodes. For instance, each value of each element of ReadingType may be represented as a data block during calculation of the tree.

Figure 5A:
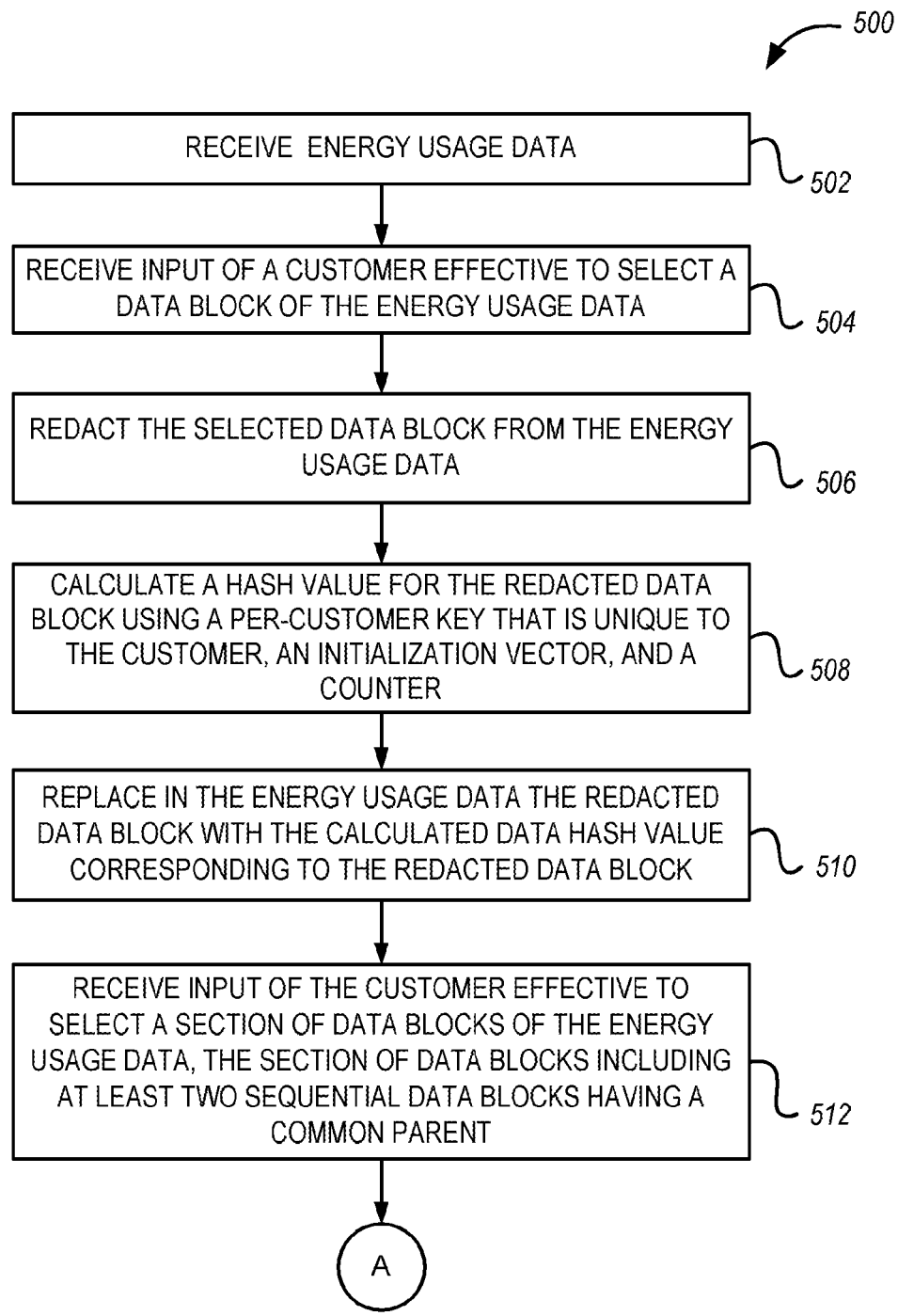
FIG. 5A is a first portion of a flow diagram of an example method of data management.
Figure 5B:
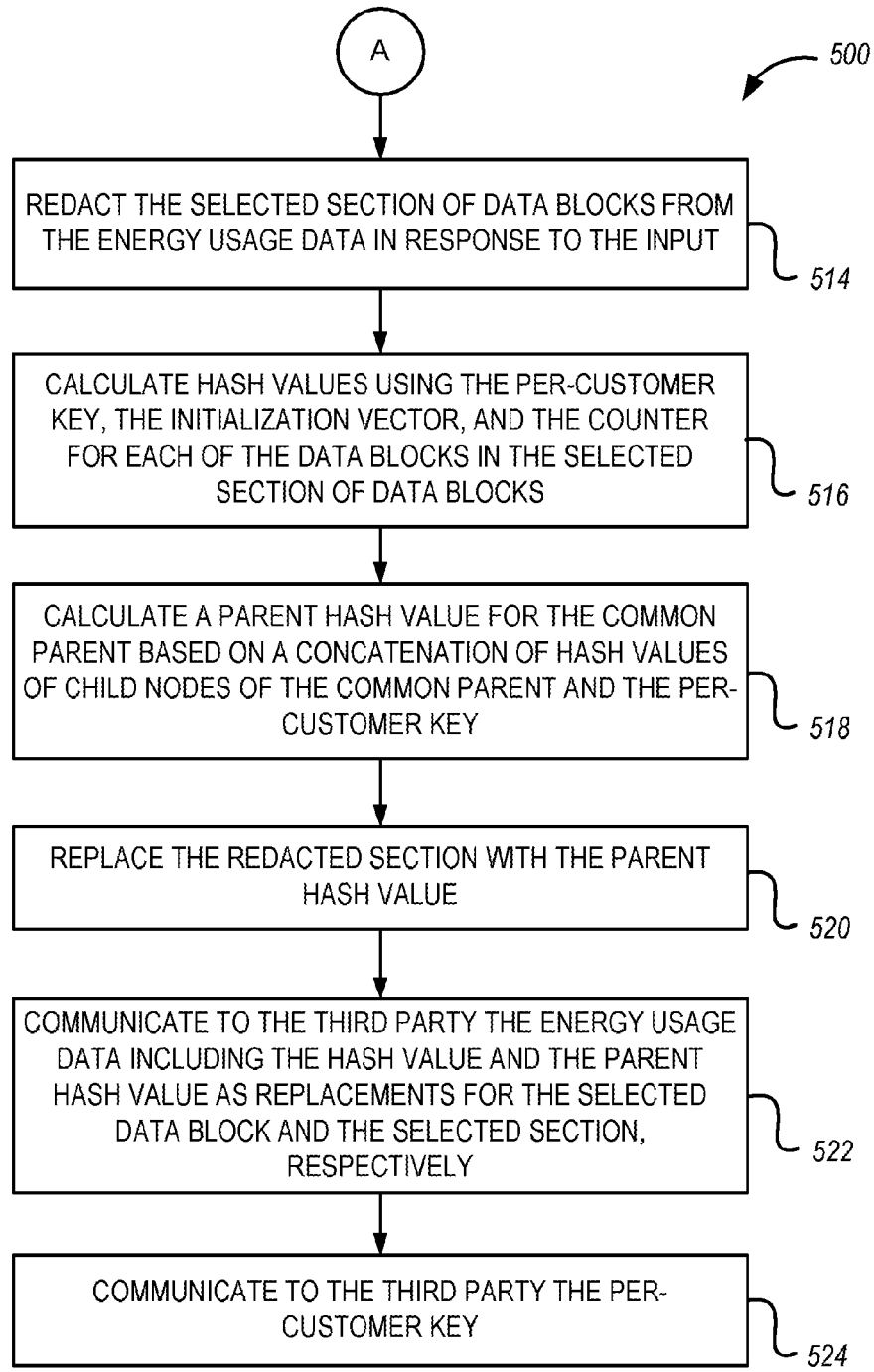
FIG. 5B is another portion of the flow diagram of the example method of data management of FIG. 5A, arranged in accordance with at least one embodiment described herein.

FIGS. 5A and 5B are a flow diagram of an example method 500 of data management, arranged in accordance with at least one embodiment described herein. The method 500 may be programmably performed in some embodiments by the repository 124 described with reference to FIGS. 1A and 1B. The repository 124 may include or may be communicatively coupled to one or more non-transitory computer-readable media (e.g., the memory 182 of FIG. 1A) having stored thereon or encoded therein programming code or instructions that are executable by one or more processors to individually or collectively perform or control performance of the method 500. Additionally or alternatively, the repository 124 may include one or more processors (e.g., the processor 184 of FIG. 1A) that are configured to execute computer instructions to cause or control performance of the method 400. Although illustrated as discrete blocks, various blocks may be divided into additional blocks, combined into fewer blocks, or eliminated, depending on the desired implementation.

With reference to FIG. 5A, the method 500 may begin at block 502. At block 502, energy usage data may be received. The energy usage data may be representative of energy usage of a customer during a particular period. The energy usage data may be signed with a digital signature of a utility.

In some embodiments, the digital signature may be made on a root hash value of a modified Merkle hash tree. The modified Merkle hash tree may include leaf nodes having hash values calculated for data blocks and non-leaf nodes having hash values of their children nodes. The hash values calculated for data blocks may be calculated according to the equation $H(D, IV, i)=M(D,(K \oplus (IV+i)))$ as described above. Additionally or alternatively, the hash values of the non-leaf nodes may be calculated according to an equation $H_P(L, R)=M(L\|R, K)$ as described above.

At block 504, input of a customer may be received. The input may be effective to select a data block of the energy usage data. At block 506, the selected data block may be redacted from the energy usage data in response to the input. At block 508, a hash value may be calculated for the redacted data block. The hash value may be calculated using a per-customer key that is unique to the customer, an initialization vector, and a counter.

For example, in some embodiments, the hash value for the redacted data block may be calculated according to the equation $H(D, IV, i)=M(D,(K \oplus (IV+i)))$. In some embodiments, the initialization vector includes a random number selected by the utility, the counter may be incremented for each of the data blocks in the energy usage data, starting at a value of one for a first data block; and the agreed-upon function may include an XOR.

At block 510, the redacted data block may be replaced in the energy usage data with the calculated hash value corresponding to the redacted data block. At block 512, input of the customer may be received. The input may be effective to select a section of data blocks of the energy usage data. The section may include at least two sequential data blocks having a common parent.

With reference to FIG. 5B, at block 514, the selected section of data blocks may be redacted from the energy usage data in response to the input. At block 516, hash values may be calculated. The hash values may be calculated using the per-customer key, the initialization vector, and the counter for each of the data blocks in the selected section. At block 518, a parent hash value may be calculated for the common parent. The parent hash value may be calculated based on a concatenation of hash values of child nodes of the common parent and the per-customer key.

For example, the common parent hash value is calculated according to the equation $H_P(L, R)=M(L\|R, K)$. At block 520, the redacted section may be replaced with the parent hash value. At block 522, the energy usage data including the hash value and the parent hash value as replacements for the selected data block and the selected section, respectively may be communicated to a third party. At block 524, the per-customer key may be communicated to the third party. Using the per-customer key, a modified Merkle hash tree may be reconstructed. The modified Merkle hash tree may include a root node on which the digital signature of the utility is made, the hash value, and the parent hash value.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

In some embodiments, the energy usage data is communicated using enhanced Green Button data scheme. The enhanced Green Button data scheme includes four enhanced data classes. A first enhanced data class may include a signature of the root node of the modified Merkle hash tree and specifies an algorithm used to create the signature. A second data class may include information about a hash algorithm used to construct the modified Merkle hash tree and an algorithm used to create a digest and the initialization vector. A third data class may include a hash value of all power usage summary elements. A fourth data class may include a hash value used for the modified Merkle hash tree calculation when the customer hides a certain portion of the energy usage data from non-trusted parties, a time and duration of the redacted energy usage data represented by the hash value, and a number of data blocks redacted by the hash.

In some embodiments, the energy usage data may be reconstructed using a modified Merkle hash tree. In the modified Merkle hash tree the leaf nodes store the hash of one of the data blocks and the non-leaf nodes store the hash of the content of their children nodes. The utility may sign the root node of the modified Merkle hash tree. In these and other embodiments, the data blocks include energy usage data from meter readings and metadata associated with the meter readings and redaction of the data blocks does not affect the root node. Additionally, the per-customer key may be shared with the utility to construct the modified Merkle hash tree and used to calculate the root hash. In addition, the per-customer key may be shared with a third party to reconstruct the modified Merkle hash tree.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
receiving, by a storage server, energy usage data representative of energy usage of a customer during a particular period, the energy usage data being signed with a digital signature of a utility;
receiving, by the storage server, input of a customer effective to select a data block of the energy usage data;
redacting, by the storage server, a selected data block from the energy usage data in response to the input;
calculating, by the storage server, a hash value for the redacted data block by application of a keyed hash function to the data block, a per-customer key that is unique to the customer, and a sum of an initialization vector and a counter; and
replacing, by the storage server, in the energy usage data the redacted data block with the calculated hash value corresponding to the redacted data block.

2. The method of claim 1, further comprising;
receiving input of the customer effective to select a section of data blocks of the energy usage data, the section of data blocks including at least two sequential data blocks having a common parent;
redacting the selected section of data blocks from the energy usage data in response to the input;
calculating hash values using the per-customer key, the initialization vector, and the counter for each of the data blocks in the selected section of data blocks;
further calculating a parent hash value for a common parent based on a concatenation of hash values of child nodes of the common parent and the per-customer key; and
replacing a redacted section with the parent hash value.

3. The method of claim 1, wherein the hash value for the redacted data block is calculated according to an equation:

$$H(D,IV,i)=M(D,(K \oplus (IV+i)));$$ in which:

H represents the hash value for the redacted data block;
D represents the data block;
IV represents the initialization vector;
i represents the counter;
K represents the per-customer key; and
$\oplus$ represents an agreed-upon operator.

4. The method of claim 2, wherein the parent hash value is calculated according to an equation:

$$H_p(L,R)=M(L\|R,K);$$ in which:

$H_p$ represents the common parent hash value;
M represents a keyed hash function;
$\|$ represents a concatenation operator;
L represents a first hash value of a first child node;
R represents a second hash value of a second child node; and
K represents the per-customer key.

5. The method of claim 3, wherein:
the initialization vector includes a random number selected by the utility;
the counter is incremented for each of the data blocks of the energy usage data, starting at a value of one for a first data block; and
the agreed-upon operator includes an XOR.

6. The method of claim 2, further comprising:
communicating to a third party the energy usage data including the hash value and the parent hash value as replacements for the selected data block and the selected section, respectively; and
further communicating to the third party the per-customer key to enable reconstruction of a modified Merkle hash tree including a root node on which the digital signature of the utility is made, the hash value, and the parent hash value.

7. The method of claim 1, wherein:
the digital signature is made on a root hash value of a root node of a modified Merkle hash tree that includes leaf nodes having hash values calculated for data blocks and non-leaf nodes having hash values of their children nodes;
the hash values calculated for data blocks are calculated according to an equation:

$$H(D,IV,i)=M(D,(K \oplus (IV+i)));$$ in which:

H represents the hash value for the data block;
D represents the data block;
IV represents the initialization vector;
i represents the counter;
K represents the per-customer key; and
$\oplus$ represents an agreed-upon operator; and
the hash values of the non-leaf nodes are calculated according to the equation:

$$H_P(L,R)=M(L\|R,K);$$ in which:

$H_P$ represents a common parent hash value;
M represents a keyed hash function;
|| represents a concatenation operator;
L represents a first hash value of a first child node;
R represents a second hash value of a second child node; and
K represents the per-customer key.

8. The method of claim 7, wherein:
the hash values of the leaf nodes are calculated using the initialization vector, the counter, and the per-customer key;
the hash values of the non-leaf nodes are calculated using a keyed hash function operating on a concatenation of the children nodes and the per-customer key;
the data blocks include energy usage data from meter readings and metadata associated with the meter readings; and
the redaction of the data block does not affect the root node.

9. The method of claim 7, wherein:
the per-customer key is shared with the utility to construct the modified Merkle hash tree and used to calculate the root hash value of the root node; and
the per-customer key is shared with a third party to reconstruct the modified Merkle hash tree.

10. The method of claim 1, wherein:
the energy usage data is communicated using an enhanced Green Button data scheme; and
the enhanced Green Button data scheme includes:
 a first enhanced data class that includes a signature of a root node of a modified Merkle hash tree and specifies an algorithm used to create the digital signature;
 a second data class that includes information about a hash algorithm used to construct the modified Merkle hash tree and an algorithm used to create a digest and the initialization vector;
 a third data class that includes a hash value of one or more power usage summary elements; and
 a fourth data class that includes a hash value used for a Merkle hash tree calculation when the customer redacts a certain portion of the energy usage data from a third party, a time and a duration of a redacted energy usage data represented by the hash value, and a number of data blocks redacted by the hash value.

11. A non-transitory computer-readable medium having encoded therein programming code executable by one or more processors to perform or control performance of operations comprising:
receiving, by the one or more processors, energy usage data representative of energy usage of a customer during a particular period, the energy usage data being signed with a digital signature of a utility;
receiving, by the one or more processors, input of a customer effective to select a data block of the energy usage data;
redacting, by the one or more processors, a selected data block from the energy usage data in response to the input;
calculating, by the one or more processors, a hash value for the redacted data block by application of a keyed hash function to the data block, a per-customer key that is unique to the customer, and a sum of an initialization vector and a counter; and
replacing, by the one or more processors, in the energy usage data the redacted data block with the calculated hash value corresponding to the redacted data block.

12. The non-transitory computer-readable medium of claim 11, wherein the operations further comprise:
receiving input of the customer effective to select a section of data blocks of the energy usage data, the section of data blocks including at least two sequential data blocks having a common parent;
redacting the selected section of data blocks from the energy usage data in response to the input;
calculating hash values using the per-customer key, the initialization vector, and the counter for each of the data blocks in the selected section of data blocks;
further calculating a parent hash value for a common parent based on a concatenation of hash values of child nodes of the common parent and the per-customer key; and
replacing a redacted section with the parent hash value.

13. The non-transitory computer-readable medium of claim 11, wherein the hash value for the redacted data block is calculated according to an equation:

$$H(D,IV,i)=M(D,(K\oplus(IV+i)));$$ in which:

H represents the hash value for the redacted data block;
D represents the data block;
IV represents the initialization vector;
i represents the counter;
K represents the per-customer key; and
$\oplus$ represents an agreed-upon operator.

14. The non-transitory computer-readable medium of claim 12, wherein the parent hash value is calculated according to an equation:

$$H_P(L,R)=M(L||R,K);$$ in which:

$H_P$ represents the common parent hash value;
M represents a keyed hash function;
|| represents a concatenation operator;
L represents a first hash value of a first child node;
R represents a second hash value of a second child node; and
K represents the per-customer key.

15. The non-transitory computer-readable medium of claim 13, wherein:
the initialization vector includes a random number selected by the utility;
the counter is incremented for each of the data blocks of the energy usage data, starting at a value of one for a first data block; and
the agreed-upon operator includes an XOR.

16. The non-transitory computer-readable medium of claim 12, wherein the operations further comprise:
communicating to a third party the energy usage data including the hash value and the parent hash value as replacements for the selected data block and the selected section, respectively; and
further communicating to the third party the per-customer key to enable reconstruction of a modified Merkle hash tree including a root node on which the digital signature of the utility is made, the hash value, and the parent hash value.

17. The non-transitory computer-readable medium of claim 11, wherein:
the digital signature is made on a root hash value of a root node of a modified Merkle hash tree that includes leaf nodes having hash values calculated for data blocks and non-leaf nodes having hash values of their children nodes;

the hash values calculated for data blocks are calculated according to an equation:

$H(D,IV,i)=M(D,(K\oplus(IV+i)))$; in which:

H represents the hash value for the data block;
D represents the data block;
IV represents the initialization vector;
i represents the counter;
K represents the per-customer key; and
$\oplus$ represents an agreed-upon operator; and the hash values of the non-leaf nodes are calculated according to the equation:

$H_P(L,R)=M(L\|R,K)$; in which:

$H_P$ represents a common parent hash value;
M represents a keyed hash function;
$\|$ represents a concatenation operator;
L represents a first hash value of a first child node;
R represents a second hash value of a second child node; and
K represents the per-customer key.

18. The non-transitory computer-readable medium of claim 17, wherein:
the hash values of the leaf nodes are calculated using the initialization vector, the counter, and the per-customer key;
the hash values of the non-leaf nodes are calculated using a keyed hash function operating on a concatenation of the children nodes and the per-customer key;
the data blocks include energy usage data from meter readings and metadata associated with the meter readings; and
the redaction of the data block does not affect the root node.

19. The non-transitory computer-readable medium of claim 17, wherein:
the per-customer key is shared with the utility to construct the modified Merkle hash tree and used to calculate the root hash value of the root node; and
the per-customer key is shared with a third party to reconstruct the modified Merkle hash tree.

20. The non-transitory computer-readable medium of claim 11, wherein:
the energy usage data is communicated using an enhanced Green Button data scheme; and
the enhanced Green Button data scheme includes:
a first enhanced data class that includes a signature of a root node of a modified Merkle hash tree and specifies an algorithm used to create the digital signature;
a second data class that includes information about a hash algorithm used to construct the modified Merkle hash tree and an algorithm used to create a digest and the initialization vector;
a third data class that includes a hash value of one or more power usage summary elements; and
a fourth data class that includes a hash value used for a Merkle hash tree calculation when the customer redacts a certain portion of the energy usage data from a third party, a time and a duration of a redacted energy usage data represented by the hash value, and a number of data blocks redacted by the hash value.

* * * * *